US009540251B2

(12) United States Patent
Huang et al.

(10) Patent No.: US 9,540,251 B2
(45) Date of Patent: Jan. 10, 2017

(54) WASTEWATER PURIFICATION WITH NANOPARTICLE-TREATED BED

(71) Applicant: BAKER HUGHES INCORPORATED, Houston, TX (US)

(72) Inventors: Tianping Huang, Spring, TX (US); James B. Crews, Willis, TX (US)

(73) Assignee: Baker Hughes Incorporated, Houston, TX (US)

( * ) Notice: Subject to any disclaimer, the term of this patent is extended or adjusted under 35 U.S.C. 154(b) by 182 days.

(21) Appl. No.: 14/332,815

(22) Filed: Jul. 16, 2014

(65) Prior Publication Data

US 2014/0326673 A1 Nov. 6, 2014

Related U.S. Application Data

(62) Division of application No. 13/542,887, filed on Jul. 6, 2012, now Pat. No. 8,815,089, which is a division
(Continued)

(51) Int. Cl.
*C02F 1/28* (2006.01)
*B01J 20/02* (2006.01)
(Continued)

(52) U.S. Cl.
CPC ............ *C02F 1/288* (2013.01); *B01J 20/0211* (2013.01); *B01J 20/0244* (2013.01);
(Continued)

(58) Field of Classification Search
CPC ....... C02F 1/288; C02F 1/001; C02F 2305/08; C02F 1/281; C02F 2303/18; C02F 2103/06; C02F 2103/10; C02F 2103/12; B01D 37/02; B01D 39/06
(Continued)

(56) References Cited

U.S. PATENT DOCUMENTS 3,675,717 A 7/1972 Goins et al.
4,385,998 A * 5/1983 Schiller .................. B01D 23/10
210/500.1
(Continued)

FOREIGN PATENT DOCUMENTS

DE 10318746 A1 * 11/2004 ............ B01J 20/041
WO 2007041553 A1 4/2007
WO 2008036812 A2 3/2008

OTHER PUBLICATIONS

J. Hibbeler, et al., "An Integrated Long-Term Solution for Migratory Fines Damages," SPE 81017, SPE Latin American and Caribbean Petroleum Engineering Conference, Apr. 27-30, 2003, pp. 1-11, Port-of-Spain, Trinidad, West Indies.
(Continued)

*Primary Examiner* — Matthew O Savage
(74) *Attorney, Agent, or Firm* — Mossman, Kumar & Tyler, P.C.

(57) ABSTRACT

Nanoparticle-treated particle packs, such as sand beds, may effectively filter and purify liquids such as waste water. When tiny contaminant particles in waste water flow through the particle pack, the nanoparticles will capture and hold the tiny contaminant particles within the pack due to the nanoparticles' surface forces, including, but not necessarily limited to van der Waals and electrostatic forces. Coating agents such as alcohols, glycols, polyols, vegetable oil, and mineral oils may help apply the nanoparticles to the particle surfaces in the filter beds or packs.

13 Claims, 6 Drawing Sheets

Related U.S. Application Data of application No. 12/111,361, filed on Apr. 29, 2008, now Pat. No. 8,226,830.

(51) Int. Cl.

| | | |
|---|---|---|
| *B01J 20/04* | (2006.01) | |
| *B01J 20/06* | (2006.01) | |
| *B01J 20/08* | (2006.01) | |
| *B01J 20/28* | (2006.01) | |
| *B01J 20/32* | (2006.01) | |
| *B82Y 30/00* | (2011.01) | |
| *C02F 1/00* | (2006.01) | |
| *B01J 20/34* | (2006.01) | |

(52) U.S. Cl.
CPC ............ *B01J 20/041* (2013.01); *B01J 20/06* (2013.01); *B01J 20/08* (2013.01); *B01J 20/28004* (2013.01); *B01J 20/28007* (2013.01); *B01J 20/3204* (2013.01); *B01J 20/3236* (2013.01); *B01J 20/3289* (2013.01); *B01J 20/3433* (2013.01); *B01J 20/3475* (2013.01); *B82Y 30/00* (2013.01); *C02F 1/001* (2013.01); *B01J 2220/46* (2013.01); *B01J 2220/66* (2013.01); *C02F 1/281* (2013.01); *C02F 2303/18* (2013.01); *C02F 2305/08* (2013.01); *Y10T 428/25* (2015.01); *Y10T 428/252* (2015.01); *Y10T 428/256* (2015.01); *Y10T 428/258* (2015.01); *Y10T 428/259* (2015.01)

(58) Field of Classification Search
USPC .................................. 210/193, 777, 679, 807
See application file for complete search history.

(56) References Cited

U.S. PATENT DOCUMENTS

| | | | |
|---|---|---|---|
| 4,643,831 | A | 2/1987 | Fletcher |
| 4,931,195 | A | 6/1990 | Cao et al. |
| 5,518,996 | A | 5/1996 | Maroy et al. |
| 5,807,812 | A | 9/1998 | Smith et al. |
| 5,858,928 | A | 1/1999 | Aubert et al. |
| 5,964,295 | A | 10/1999 | Brown et al. |
| 6,211,120 | B1 | 4/2001 | Welch et al. |
| 6,258,859 | B1 | 7/2001 | Dahayanake et al. |
| 6,306,800 | B1 | 10/2001 | Samuel et al. |
| 6,447,577 | B1 | 9/2002 | Espin et al. |
| 6,506,710 | B1 | 1/2003 | Hoey et al. |
| 6,599,863 | B1 | 7/2003 | Palmer et al. |
| 6,605,570 | B2 | 8/2003 | Miller et al. |
| 6,613,720 | B1 | 9/2003 | Feraud et al. |
| 6,631,764 | B2 | 10/2003 | Parlar et al. |
| 6,821,434 | B1 | 11/2004 | Moore et al. |
| 6,838,005 | B2 | 1/2005 | Tepper et al. |
| 6,860,924 | B2 | 3/2005 | Rajagopalan et al. |
| 6,881,709 | B2 | 4/2005 | Nelson et al. |
| 6,919,029 | B2 | 7/2005 | Meng et al. |
| 7,036,585 | B2 | 5/2006 | Zhou et al. |
| 7,052,901 | B2 | 5/2006 | Crews |
| 7,060,661 | B2 | 6/2006 | Dobson, Sr. et al. |
| 7,081,439 | B2 | 7/2006 | Sullivan et al. |
| 7,084,095 | B2 | 8/2006 | Lee et al. |
| 7,112,237 | B2 | 9/2006 | Zeller et al. |
| 7,131,491 | B2 | 11/2006 | Blauch et al. |
| 7,204,311 | B2 | 4/2007 | Welton et al. |
| 7,207,388 | B2 | 4/2007 | Samuel et al. |
| 7,211,320 | B1 | 5/2007 | Cooper et al. |
| 7,226,896 | B2 | 6/2007 | Audibert-Hayet et al. |
| 7,258,170 | B2 | 8/2007 | Nguyen et al. |
| 7,265,079 | B2 | 9/2007 | Willberg et al. |
| 7,343,972 | B2 | 3/2008 | Willingham et al. |
| 7,347,266 | B2 | 3/2008 | Crews et al. |
| 7,550,413 | B2 | 6/2009 | Huang et al. |
| 7,595,284 | B2 | 9/2009 | Crews |
| 7,645,724 | B2 | 1/2010 | Crews |
| 7,703,531 | B2 | 4/2010 | Huang et al. |
| 7,721,803 | B2 | 5/2010 | Huang et al. |
| 7,723,272 | B2 | 5/2010 | Crews et al. |
| 8,499,832 | B2 * | 8/2013 | Crews .................. B01J 20/0211 166/276 |
| 2001/0023849 | A1 | 9/2001 | Robertson |
| 2003/0092581 | A1 | 5/2003 | Crews |
| 2003/0134409 | A1 | 7/2003 | Mallouk et al. |
| 2003/0155302 | A1 | 8/2003 | Meng et al. |
| 2003/0234103 | A1 | 12/2003 | Lee et al. |
| 2004/0106525 | A1 | 6/2004 | Willberg et al. |
| 2004/0152601 | A1 | 8/2004 | Still et al. |
| 2005/0107265 | A1 | 5/2005 | Sullivan et al. |
| 2005/0252658 | A1 | 11/2005 | Willingham et al. |
| 2006/0027369 | A1 | 2/2006 | Baycroft et al. |
| 2006/0041028 | A1 | 2/2006 | Crews |
| 2006/0162928 | A1 | 7/2006 | Collins et al. |
| 2006/0211775 | A1 | 9/2006 | Crews |
| 2006/0211776 | A1 | 9/2006 | Crews |
| 2006/0258541 | A1 | 11/2006 | Crews |
| 2007/0056737 | A1 | 3/2007 | Crews et al. |
| 2007/0175196 | A1 | 8/2007 | Tepper et al. |
| 2008/0051302 | A1 | 2/2008 | Crews et al. |
| 2008/0060812 | A1 | 3/2008 | Huang et al. |
| 2008/0139419 | A1 | 6/2008 | Huang |
| 2009/0107673 | A1 | 4/2009 | Huang et al. |
| 2009/0111718 | A1 | 4/2009 | Gadiyar et al. |
| 2009/0312201 | A1 | 12/2009 | Huang et al. |
| 2009/0312204 | A1 | 12/2009 | Huang |
| 2010/0000734 | A1 | 1/2010 | Huang et al. |
| 2010/0108613 | A1 | 5/2010 | Crews et al. |
| 2010/0286000 | A1 | 11/2010 | Huang et al. |

OTHER PUBLICATIONS

J. B. Crews, "Internal Phase Breaker Technology for Viscoelastic Surfactant Gelled Fluids," SPE 93449, 2005 SPE International Symposium on Oilfield Chemistry, Houston, Texas Feb. 2-4, 2005.

Schlumberger, "ClearFRAC HT Surfactant" Datasheet, Apr. 2005.

C. H. Bivins, et al., "New Fibers for Hydraulic Fracturing," Oilfield Review, Summer 2005, pp. 34-43.

Schlumberger, "ClearFRAC HiPerm Surfactant" Datasheet, Aug. 2005.

R. Gdanski, et al., "Fracture Face Skin Evolution During Cleanup," SPE 101083, 2006 SPE Annual Technical Conference and Exhibition, San Antonio, Texas, Sep. 24-27, 2006.

J. A. Ayoub, et al., "New Results Improve Fracture Cleanup Characterization and Damage Mitigation," SPE 102326, 2006 SPE Annual Technical Conference and Exhibition, San Antonio, Texas, Sep. 24-27, 2006.

H. A. Nasr-El-Din, et al., "Lessons Learned and Guidelines for Matrix Acidizing with Viscoelastic Surfactants," SPE 102468, 2006 SPE Annual Technical Conference and Exhibition, San Antonio, Texas, Sep. 24-27, 2006.

H. A. Nasr-El-Din, et al., "Acid Fracturing of Deep Gas Wells Using a Surfactant-Based Acid: Long-Term Effects on Gas Production Rate," SPE 102469, 2006 SPE Annual Technical Conference and Exhibition, San Antonio, Texas, Sep. 24-27, 2006.

P. D. Nguyen, et al., "Controlling Formation Fines at Their Sources to Maintain Well Productivity," SPE 97659, SPE International Improved Oil Recovery Conference in Asia Pacific, Kuala Lumpur, Dec. 5-6, 2005; republished SPE Production & Operations, May 2007, pp. 202-215.

T. Huang, et al., "Nanotechnology Applications in Viscoelastic Surfactant Stimulation Fluids," SPE 107728, European Formation Damage Conference, Scheveningen, The Netherlands, 30 May 30-Jun. 1, 2007.

Clearfrac HT Web page, 2007, available at http://www.slb.com/content/services/stimulation/fracturing/clearfrac_ht.asp?

Clearfrac HT Web page, 2007, available at http://www.slb.com/content/services/stimulation/fracturing/clearfrac_hiperm.asp?

C. Lu, et al., "Chemical Modification of Multiwalled Carbon Nanotubes for Sorption of $Zn^{2+}$ from Aqueous Solution," Chem. Engr. Jrnl, 2008, pp. 462-468, vol. 139.

(56) References Cited

OTHER PUBLICATIONS

A.T. Heitsch, et al., "Multifunctional Particles: Magnetic Nanocrystals and Gold Nanorods Coated With Fluorescent Dye-doped Silica Shells," Jrnl of Solid State Chem., 2008, pp. 1590-1599, vol. 181.

Martin Marietta Magnesia Specialties LLC, "THIOGUARD Brochure," available at http://www.magnesiaspecialties.com/Thioguard/thio_PDF/Thioguard.pdf.

C. Babe, et al., "New Insight to Desulfurization Process: Geometric Modeling of the Sulfidation of ZnO by H2S," Prepr. Pap.-Am. Chem. Soc., Div. Petr. Chem. 2007, vol. 52, No. 2, pp. 31-34.

J. V. Stark, et al., "Nanoscale Metal Oxide Particles/Clusters as Chemical Reagents. Unique Surface Chemistry on Magnesium Oxide as Shown by Enhanced Adsorption of Acid Gases (Sulfur Dioxide and Carbon Dioxide) and Pressure Dependence," Am. Chem. Soc., Chem. Mater. 1996, vol. 8, pp. 1904-1912.

Y. Ding, et al., "Nanoscale Magnesium Hydroxide and Magnesium Oxide Powders: Control over Size, Shape and Structure via Hydrothermal Synthesis," Am. Chem. Soc., Chem. Mater. 2001, vol. 13, pp. 435-440.

\* cited by examiner

WASTEWATER PURIFICATION WITH NANOPARTICLE-TREATED BED

CROSS-REFERENCE TO RELATED APPLICATION

This application is a divisional application from U.S. patent application Ser. No. 13/542,887, filed Jul. 6, 2012; which was a divisional application from U.S. patent application Ser. No. 12/111,361 filed Apr. 29, 2008 and issued as U.S. Pat. No. 8,226,830 on Jul. 24, 2012; all of which are incorporated herein by reference in their entirety.

TECHNICAL FIELD

The present invention relates to methods and compositions for removing contaminants from liquids, such as wastewater, and more particularly relates, in one non-limiting embodiment, to methods and compositions for removing contaminants from wastewater using particle packs that have been treated with nano-sized particles.

BACKGROUND

Many methods and processes are known to clean, purify, clarify and otherwise treat fluids for proper disposal, consumption, use, and other needs. These methods include, but are not necessarily limited to, centrifugation and filtration to remove particulates, chemical treatments to sterilize water, distillation to purify liquids, decanting to separate two phases of fluids, reverse osmosis to desalinate liquids, electrodialysis to desalinate liquids, pasteurization to sterilize foodstuffs, and catalytic processes to covert undesirable reactants into useful products. Each of these methods is well-suited for particular applications and typically a combination of methods is used for a final product.

There are many different known technologies available for the sterilization of liquid. Adsorption, chemical treatments, ozone disinfection, and ultraviolet (UV) irradiation all perform very well for the removal of pathogenic microbes. However, each of these technologies has limitations, including overall efficacy, initial capital cost, operating cost, byproduct risk, necessary pre-treatment of liquid, hazardous compounds used or produced, and which thus must be properly disposed of, and other limitations.

Although chemical methods are the most widespread in use, they have a number of shortcomings. Such drawbacks include increasing microbiological adaptation to their destructive effects, safety hazards associated with chlorine use and storage, and environmental impact. UV is a popular treatment, but the liquid must be clear in order for it to be effective, and it does not break down any biofilm formation; it is also very expensive to install and operate. In industrial and municipal applications such as water and wastewater plants, the three most widely used methods of liquid sterilization are ozone treatment, chlorine treatment, and UV irradiation.

Desalination of liquids is highly useful for drinking water, biological fluids, medicines, chemicals, petroleum and its derivatives, and many other liquids. In addition, desalination of water would be beneficial since less than 0.5% of the Earth's water is directly suitable for human consumption, agricultural, or industrial uses. Consequently, desalination is finding increasing favor to produce potable water from brackish groundwater and seawater since it makes the other approximately 99.5% of the water available. There are five basic desalination methods: thermal, reverse osmosis, electrodialysis, ion exchange, and freezing. Thermal and freezing processes remove fresh water from saline leaving behind concentrated brine. Reverse osmosis and electrodialysis employ membranes to separate salts from fresh water. Ion exchange involves passing salt water over resins which exchange more desirable ions for less desirable dissolved ions. Only thermal and reverse osmosis processes are currently commercially viable. Even so, these two methods tend to be prohibitive due to their expense.

There is always a need to develop new apparatus and methods that will help perform these methods and processes more cost effectively than their traditional counterparts. In the area of liquid purification, any technology that can lower the overall cost, simplify the process, and improve efficiencies would be very advantageous. It would thus be desirable if methods and/or structures would be devised to purify liquids, such as wastewater, using simple methods and devices.

SUMMARY

There is provided, in one form, a method for purifying an aqueous liquid containing contaminant particles selected from the group consisting of clay particles, silica particles, sediments, soil particles, mining particles and water treatment particles. The method may include contacting the aqueous liquid containing the contaminant particles with a particle pack having substrate particles and comparatively smaller particulate additives and attracting the contaminant particles from the aqueous liquid to the particulate additive to purify the aqueous liquid. The substrate particles may be comparatively larger than the particulate additive and may be or include sand, gravel, ceramic beads, glass beads, and combinations thereof. The particle pack may be at least partially coated with a coating agent including a carrier fluid, such as alcohol, glycol, polyol, vegetable oil, mineral oil, and combinations thereof. The particulate additives may have a mean particle size of 1000 nm or less and may be or include alkaline earth metal oxides, alkaline earth metal hydroxides in the absence of magnesium oxide, alkali metal oxides, alkali metal hydroxides, transition metal oxides, transition metal hydroxides, post-transition metal oxides, post-transition metal hydroxides, piezoelectric crystals, pyroelectric crystals, and mixtures thereof.

There is additionally provided in another non-limiting embodiment of the method where the substrate particles have a mean particle size of from about 2000 microns to about 45 microns and where the particulate additive may range from about 1 part by weight for about 200 to about 5000 parts by weight of the particle pack.

There is additionally provided in another non-limiting embodiment of the method where the coating agent may be an oil-wetting surfactant and a mineral oil, and where the particulate additives are at least partially coated on the substrate particles by the mineral oil.

The particulate additives, also referred to herein as nano-sized particles or nanoparticles (e.g. MgO and/or $Mg(OH)_2$, and the like), appear to fixate, bind up, or otherwise capture contaminants, such as clay and non-clay particles, including charged and non-charged particles. Due to at least in part to their small size, the surface forces (e.g. van der Waals and electrostatic forces) of the nanoparticles help them associate, group or flocculate the tiny contaminant particles together in larger collections, associations or agglomerations. Such groupings or associations help capture the contaminants in place and keep them from moving and passing through with the liquid, resulting in a purified liquid. In many cases, the purifying ability of the particle pack may be improved by use of nano-sized particulate additives that may be much smaller in size than the contaminants.

The addition of alkaline earth metal oxides, such as magnesium oxide; alkaline earth metal hydroxides, such as calcium hydroxide; transition metal oxides, such as titanium oxide and zinc oxide; transition metal hydroxides; post-transition metal oxides, such as aluminum oxide; post-transition metal hydroxides; piezoelectric crystals and/or pyroelectric crystals such as ZnO and $AlPO_4$, to an aqueous fluid, a solvent-based fluid such as glycol, or oil-base fluid, e.g. mineral oil, may be used to treat the particle pack, such as a sand bed, which in turn is expected to purify, clarify and otherwise clean the fluid.

DETAILED DESCRIPTION

Figure 1:
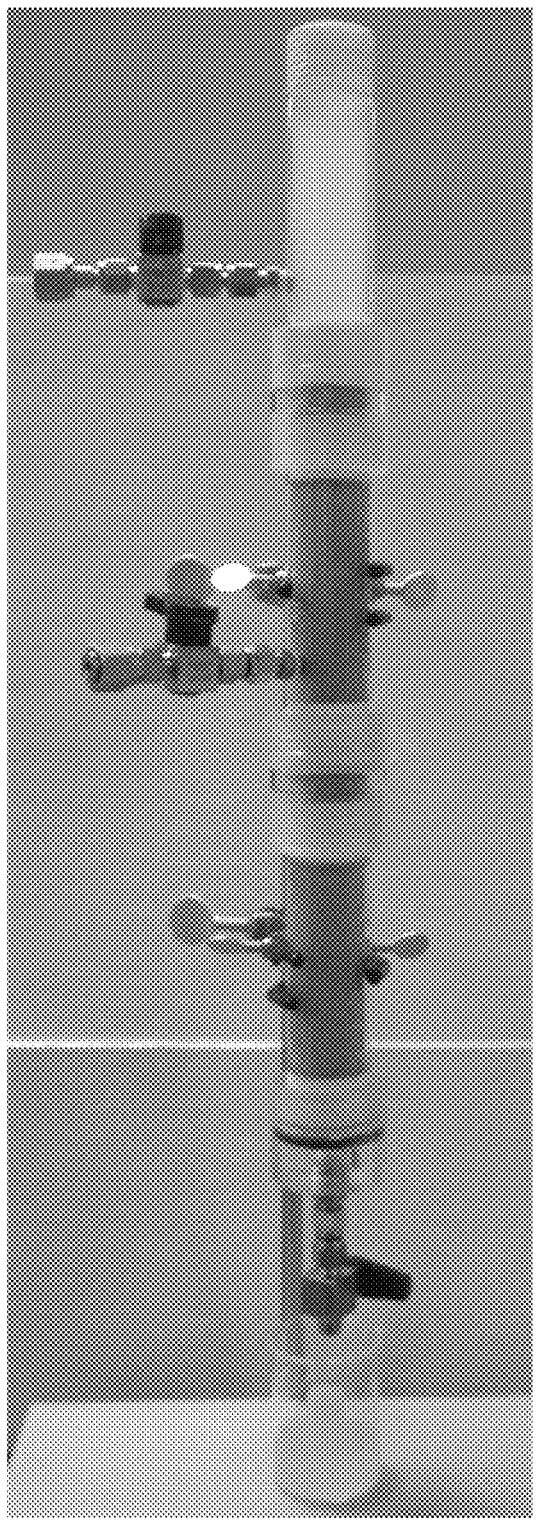
FIG. 1 is a photograph of a sand pack test apparatus for a sand pack that is untreated with nanoparticles, showing cloudy fluid simulating waste water at the top of the apparatus and cloudy fluid flowing from the apparatus at the bottom.

Methods and compositions of nanoparticle-treated sand beds have been discovered as useful to purify waste water. When tiny contaminant particles in waste water flow through a nanoparticle-treated sand bed, the nanoparticles will capture and hold the tiny contaminant particles in the sand bed by the nanoparticles' surface forces, including but not necessarily limited to, van der Waals and electrostatic forces, thereby removing them from the liquid. The contaminants or impurities may include, but not necessarily be limited to, sediments, soil particles, mining particles, water treatment particles, and the like. In one non-limiting embodiment the treated fluids are aqueous, by which is meant they contain water; in a non-restrictive, alternative embodiment the aqueous fluids are at least 50 weight% water, alternatively at least 30 wt % water. The purified water may thus be used as injection water in underground hydrocarbon reservoirs to effectively recover hydrocarbons, or as municipal water for continued purification for human consumption.

It has been discovered that nano-sized particles like magnesium oxide (MgO) may be used to remove contaminants such as clay and non-clay particles from liquids, that is, to remove, reduce or rid them from being present in the fluid, such as water. Some nano-sized particles, also called nanoparticles herein, not only have high surface areas compared to their small sizes, but also have relatively high surface charges that permit them to associate, link or connect other particles together, including other charged particles, but also other non-charged particles. In one non-limiting embodiment, these associations or connections between the contaminant particles and the nano-sized particles are due to electrical attractions and other intermolecular forces or effects.

As will be shown, laboratory tests have demonstrated that relatively small amounts of MgO nanoparticles can remove and eliminate dispersed clay particles. It is expected that charged and non-charged colloidal silicas will also be removed. Other nanoparticles such as ZnO, $Al_2O_3$, zirconium dioxide ($ZrO_2$), $TiO_2$, cobalt (II) oxide (CoO), nickel (II) oxide (NiO), and pyroelectric and piezoelectric crystals may also be used in the methods and compositions herein.

The nanoparticles may be applied directly to and placed on and in a particulate pack, such as a sand bed, typically by contacting the pack or bed with a fluid in which the nanoparticles are suspended. In one embodiment, a mixture of a coating agent and nanoparticles at least partially coat the selected sand bed or other porous media (substrate particles). If sand or gravel is at least partially coated with the coating agent and the nanoparticles, then the contaminants and impurities may be removed from the fluid, e.g. wastewater, and may be eliminated or suppressed thereby purifying the fluid.

The coating agent may be a carrier fluid that includes, but is not necessarily limited to, an alcohol, glycol, polyol, vegetable oil, fish oil and combinations thereof. One particularly suitable carrier fluid may be monopropylene glycol. Alternatively, suitable coating agents include, but are not necessarily limited to, mineral oil or other hydrocarbon that accomplishes the purposes of the methods and compositions described herein. Specific, non-limiting examples of suitable mineral oils include ConocoPhillips PURE PERFORMANCE® Base Oils II or III, such as 225N, 600N, ULTRA-ST™ 3 and ULTRA-ST™ 8; Penreco DRAKEOL® oils, such as DRAKEOL® 21, DRAKEOL® 35 and DRAKEOL® 600; and ExxonMobil Chemical mineral oils, such as EXXSOL® D80 and ISOPAR® M oils. It is expected that a filtering or purification product will include nanoparticles in the coating agent oil, for instance about 15 wt % nano-sized MgO particles in the Drakeol® 600 mineral oil. It has been discovered that during mixing with the particles of the pack or bed, the nanoparticles in oil, glycol, or other carrier will plate out on or at least partially coat the substrate particles. How much coating of the substrate particles that occurs is concentration dependant, based on both the amount of particles, e.g. sand, used and the amount of nanoparticles used. In a non-limiting example, the carrier fluid may additionally have a surfactant present, such as an oil-wetting surfactant like sorbitan monooleate (i.e. SPAN 80 from Uniqema), to improve and/or enhance the oil-wetting of the pack or bed substrate particles by the nanoparticles. In another non-limiting example, the presence of a surfactant may preferentially reduce the thickness of the DRAKEOL® 600 mineral oil layer on the sand pack particles. Reduced oil layer thickness may enhance nanoparticle exposure on the sand or ceramic particles. Use of lower viscosity mineral oils, such as DRAKEOL® 15, DRAKEOL® 18 or EXXSOL® D80 can also be used to reduce oil layer thickness. Other agents besides SPAN 80 may be employed to optimize the oil coating or wetting or thickness on the sand pack or ceramic bed particles, agents such as: sorbitan esters, ethoxylated sorbitan esters, ethoxylated alcohols, ethoxylated alkyl-phenols, alkyl-dicarboxylics, sulfosuccinates, phospholipids, alkylamines, quaternary amines, alkyl-siloxanes, and the like. It is not necessary that a resin be used as a coating agent or binder, and in one non-limiting embodiment, no resin is used.

It is theorized that the nanoparticles remain on the particles of the particle pack primarily by electrostatic and other charges between the nanoparticle and particle surfaces, however, other attractions or coupling forces may exist to initially and over the long-term keep the nanoparticles coated on the pack or bed substrate particles. The inventors do not want to be limited to any particular theory. It is suspected that in most conditions the carrier fluid only assists the initial coating process of the nanoparticles on to the substrate particles of the pack or bed. However, other agents may be added to the carrier fluid that may further enhance the initial and/or long-term nanoparticle attraction to the sand (silica or quartz or feldspars), glass, ceramic and the like particles.

Nano-sized particles of alkaline earth metal oxides, alkaline earth metal hydroxides, alkali metal oxides, alkali metal hydroxides, transition metal oxides, transition metal hydroxides, post-transition metal oxides, and post-transition metal hydroxides, piezoelectric crystals, pyroelectric crystals, and mixtures thereof have been discovered to have particular advantages for filtering out and binding up impurities and contaminants, thereby purifying fluids.

Magnesium oxide particles and powders have been suitably used to filter fluids herein. However, it will be appreciated that although MgO particles are noted throughout the description herein as one representative or suitable type of alkaline earth metal oxide and/or alkaline earth metal hydroxide particle, other alkaline earth metal oxides and/or alkaline earth metal hydroxides and/or transition metal oxides, transition metal hydroxides, post-transition metal oxides, and post-transition metal hydroxides, piezoelectric crystals, pyroelectric crystals, may be used in the methods and compositions herein. Additionally, the alkali metal oxides and/or hydroxides may be used alone or in combination with the alkaline earth metal oxides and hydroxides, and/or together with one or more transition metal oxide, transition metal hydroxide, post-transition metal oxide, post-transition metal hydroxide, piezoelectric crystal, and pyroelectric crystal.

By "post-transition metal" is meant one or more of aluminum, gallium, indium, tin, thallium, lead and bismuth. In another non-limiting embodiment herein, the nano-sized particles are oxides and hydroxides of elements of Groups IA, IIA, IVA, IIB and IIIB of the previous IUPAC American Group notation. These elements include, but are not necessarily limited to, Na, K, Mg, Ca, Ti, Zn and/or Al. In one non-limiting embodiment, there is an absence of alumina (aluminum oxide) and/or aluminum hydroxide from the suitable nanoparticles.

The nano-sized particulate additives herein may also be piezoelectric crystal particles (which include pyroelectric crystal particles). Pyroelectric crystals generate electrical charges when heated and piezoelectric crystals generate electrical charges when squeezed, compressed or pressed.

In one non-limiting embodiment, specific suitable piezoelectric crystal particles may include, but are not necessarily limited to, ZnO, berlinite ($AlPO_4$), lithium tantalate ($LiTaO_3$), gallium orthophosphate ($GaPO_4$), $BaTiO_3$, $SrTiO_3$, $PbZrTiO3$, $KNbO_3$, $LiNbO_3$, $LiTaO_3$, $BiFeO_3$, sodium tungstate, $Ba_2NaNb_5O_5$, $Pb_2KNb_5O_{15}$, potassium sodium tartrate, tourmaline, topaz and mixtures thereof. The total pyroelectric coefficient of ZnO is $-9.4\ C/m^2K$. ZnO and these other crystals are generally not water soluble.

In one non-restrictive explanation, when the particle pack or sand bed contains very small pyroelectric crystals, such as nano-sized ZnO, the pyroelectric crystals may be heated and/or pressed and high surface charges are generated. The surface charges may be generated or produced if the fluid is under pressure. These surface charges permit the crystal particles to associate, link, connect or otherwise relate the impurities and contaminants together to bind them together and also to the surrounding particle pack or sand surfaces. The association or relation of the impurities or contaminants is thought to be very roughly analogous to the crosslinking of polymer molecules by crosslinkers, in one non-limiting image.

In another non-limiting embodiment, the nano-sized solid particulates and powders useful herein include, but are not necessarily limited to, alkaline earth metal oxides or alkaline earth metal hydroxides, or mixtures thereof. In one non-limiting embodiment, the alkaline earth metal in these additives may include, but are not necessarily limited to, magnesium, calcium, barium, strontium, combinations thereof and the like. In one non-limiting embodiment, MgO may be obtained in high purity of at least 95 wt %, where the balance may be impurities such as $Mg(OH)_2$, CaO, $Ca(OH)_2$, $SiO_2$, $Al_2O_3$, and the like.

In an additional non-restrictive version, the particle size of the additives and agents ranges between about 4 nanometers independently up to about 1000 nanometers. In another non-limiting embodiment, the particle size ranges between about 4 nanometers independently up to about 500 nanometers. In another non-restrictive version, the particles may have a mean particle size of about 250 nm or less, alternatively about 100 nm or less, and in another possible version about 50 nm or less, alternatively 40 nm or less.

The amount of nano-sized particles in the sand or ceramic bed pack material may be from about 1 pound of nanoparticles for about 200 pounds to 5000 pounds of sand. It will be appreciated that any other unit of weight may be used, for instance, from about 1 gram of nanoparticles for about 200 grams to 5000 grams of sand. In an alternate embodiment, the nanoparticles are present in an amount of from about 1 part by weight nanoparticles to about 1000 independently to about 2000 parts sand or ceramic pack material.

The nano-sized particles herein may be added to water, a glycol, alcohol, polyol, olefin, vegetable oil, fish oil, or mineral oil, or mixtures of these, as the carrier fluid—a combination which also serves to initially coat, or at least partially coat, the nanoparticles to the sand or ceramic. In another non-limiting embodiment, the nano-sized particles coated on ceramic particles or sand herein may be added to an aqueous fluid during a treatment.

The sand, ceramic, glass or other substrate particles of the pack or bed may have a mean particle size of the particles of from about 10 mesh to about 325 mesh (about 2000 microns to about 45 microns), in one non-limiting embodiment. Alternatively, the substrate particles may range in size from about 20 mesh independently to about 200 mesh (from about 850 microns independently to about 75 microns). The substrate particle size range may be wide, such as from about 40 mesh to about 200 mesh (from about 425 microns to about 250 microns), or the particle size range may be relatively narrow, such as from about 20 mesh to about 40 mesh (from about 850 microns to about 425 microns).

In another non-limiting version, the nanoparticles may be coated on ceramic or sand at a supplier facility before use in a fluid purifying treatment. In a different non-limiting embodiment, a select portion of the sand or ceramic may be lightly coated with carrier fluid containing nanoparticles during a treatment, or before a fluid purification or clarification treatment. It has been discovered that PG-coated nanoparticles tend to be attached to, adhered to, or bound to the ceramic particles or sand.

Laboratory tests have shown that 35 nanometer MgO particles and monopropylene glycol (PG) coated on a 20/40 mesh (850/425 micron) sand pack can successfully remove contaminants from wastewater.

While the methods and structures herein are sometimes described typically herein as having use in wastewater fluids, such as those from paper processing, the compositions and methods are also expected to be useful in oil field recovery, e.g. produced formation water, exhausted drilling muds, metal-working, agricultural operations, mining operations, environmental remediation operations, waste disposal operations, cleaning operations, manufacturing operations and the like.

The invention will be further described with respect to the following Examples which are not meant to limit the invention, but rather to further illustrate a few of the various embodiments.

EXAMPLES

Figure 6:
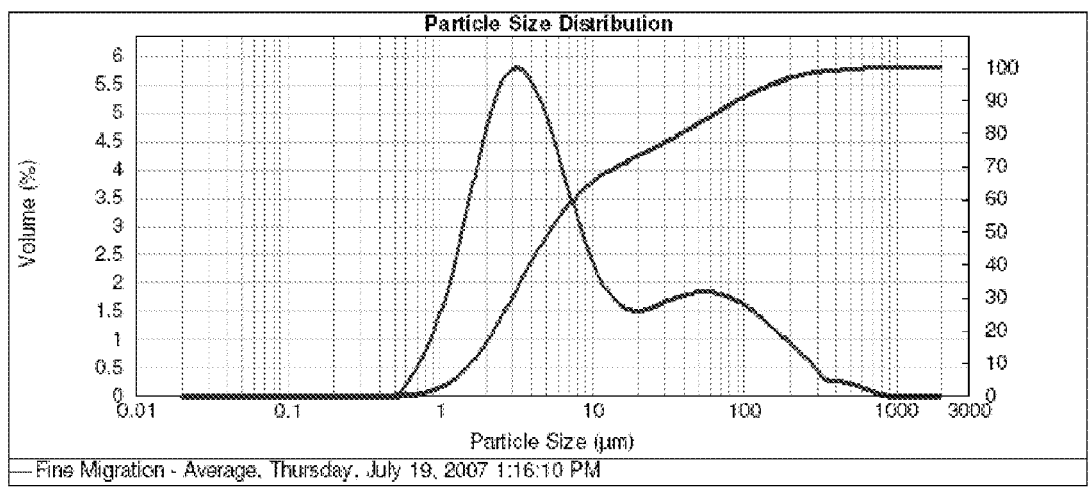
FIG. 6 is a particle size distribution (PSD) of the bentonite particles used in the simulated wastewater used in the above test apparatus, illustrating a volume weighted mean particle size of about 31.2 microns.

Laboratory sand pack tests (20/40 mesh or 850/425 micron) with and without nanoparticles treatment show that nanoparticle-treated sand packs may capture and hold tiny particles that cloud a simulated wastewater. A simulated wastewater was prepared with 0.25% by weight (bw) natural bentonite and 0.25% bw illite in water. The graph of particle size distribution (PSD) for bentonite is shown in FIG. 6. The volume weighted mean size for the bentonite from the PSD analysis was about 31.2 microns. A similar PSD analysis for the illite gave a volume weighted mean size of about 33.0 microns.

Comparative Example 1

Figure 2:
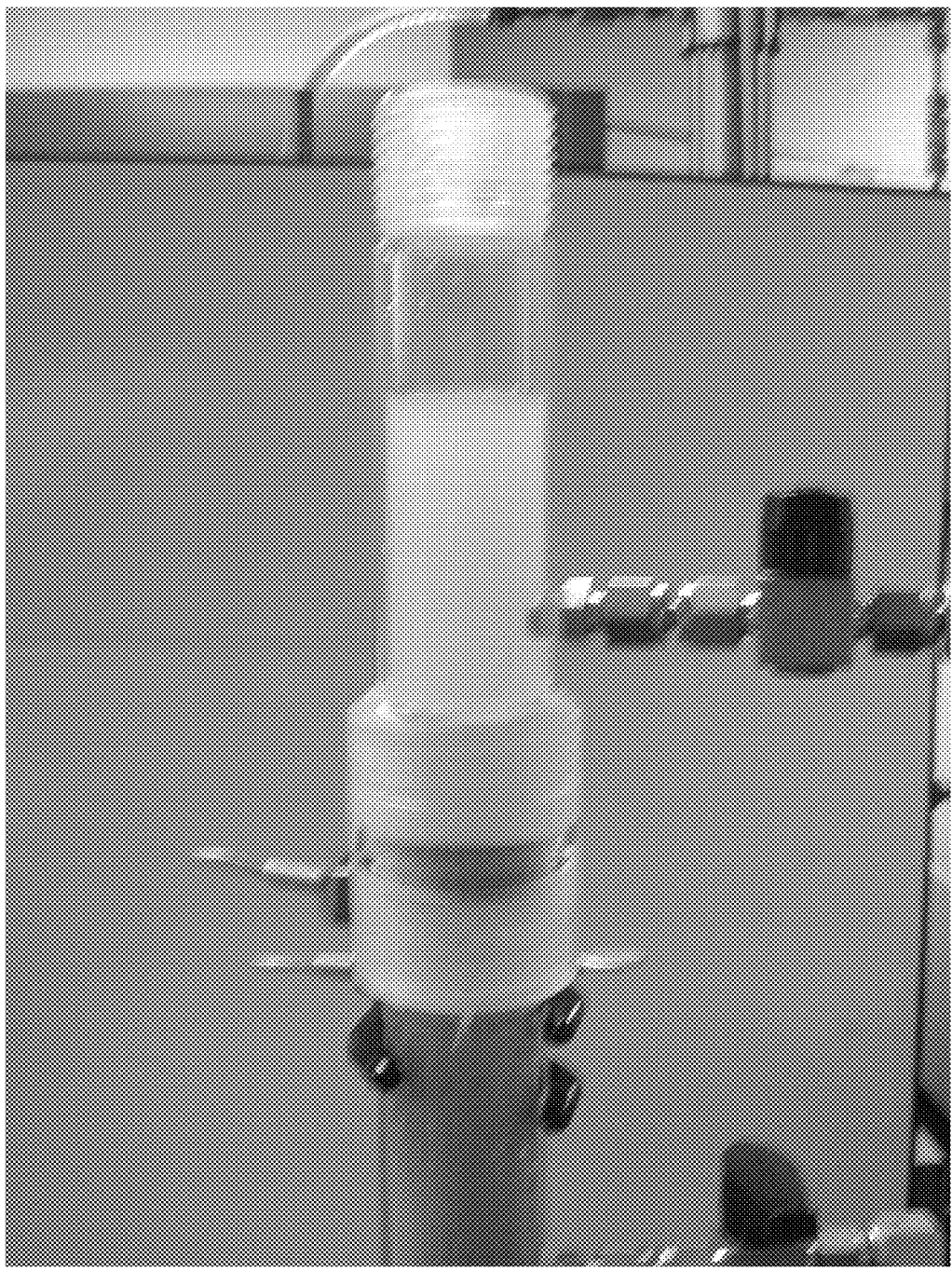
FIG. 2 is a more detailed photograph of the cloudy fluid simulating waste water at the top of the sand pack test apparatus of FIG. 1.
Figure 3:
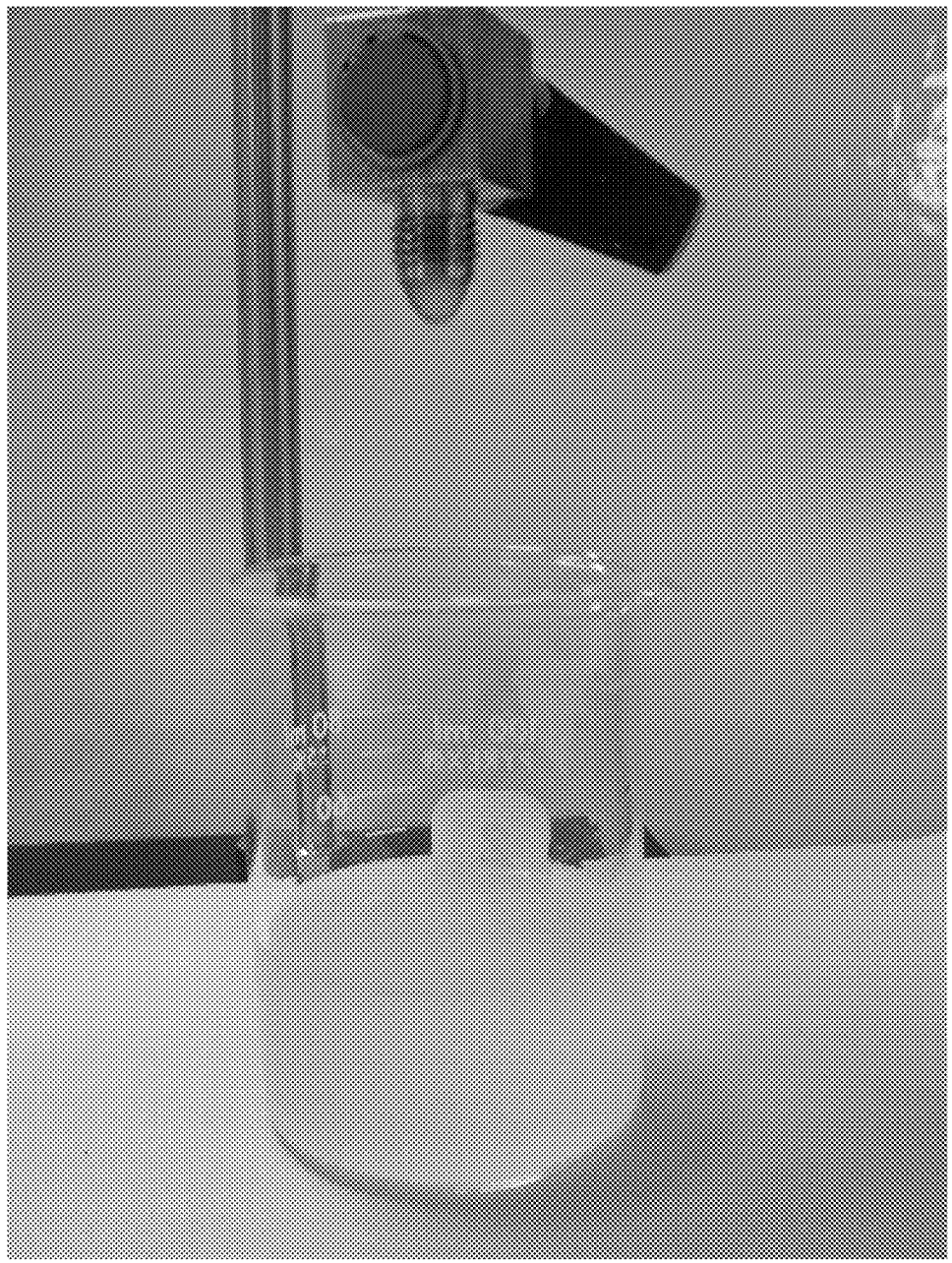
FIG. 3 is a is a more detailed photograph of the cloudy fluid having passed through the sand pack test apparatus of FIG. 1 showing that the fluid remains cloudy.

A test without a nanoparticle-treated sand pack demonstrates that cloudy water flows into the pack, and essentially the same cloudy water flows out of the pack. FIG. 1 is a photograph of a sand pack test apparatus for a sand pack that is untreated with nanoparticles, showing cloudy fluid simulating waste water at the top of the apparatus and essentially the same cloudy fluid flowing from the apparatus at the bottom. FIG. 2 is a more detailed photograph of the cloudy fluid simulating waste water at the top of the sand pack test apparatus of FIG. 1. FIG. 3 is a more detailed photograph of the cloudy fluid having passed through the sand pack test apparatus of FIG. 1 showing that the fluid remains cloudy.

Inventive Example 2

Figure 4:
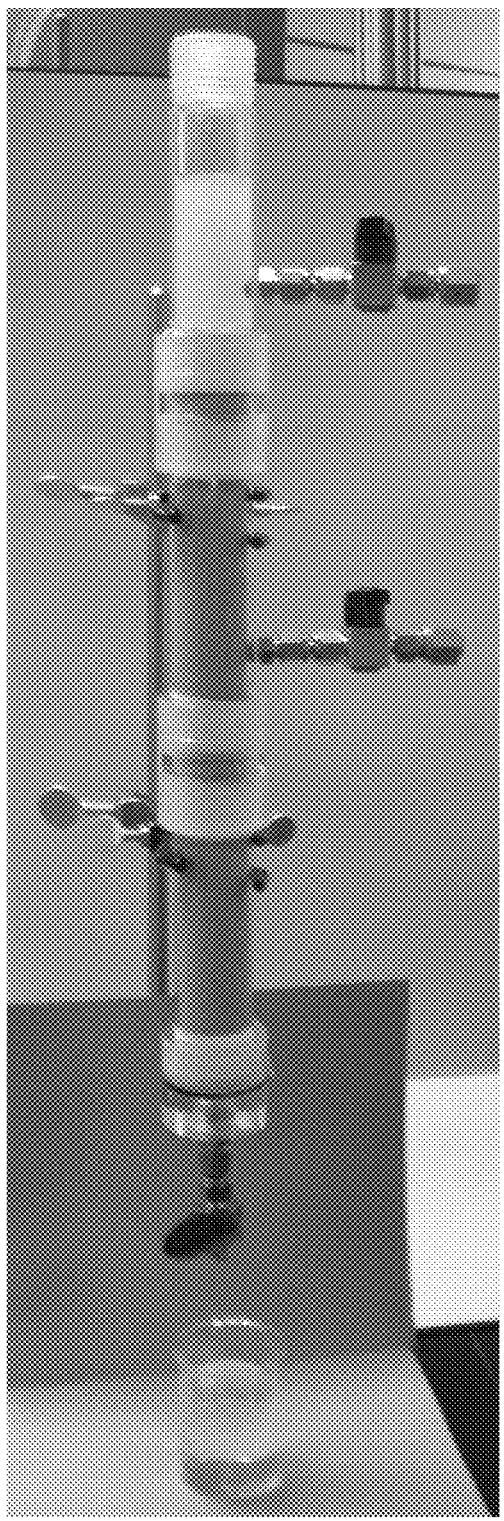
FIG. 4 is a photograph of the sand pack test apparatus for a sand pack that has been treated with nanoparticles, showing cloudy fluid simulating waste water at the top of the apparatus and clear water flowing from the apparatus at the bottom.
Figure 5:
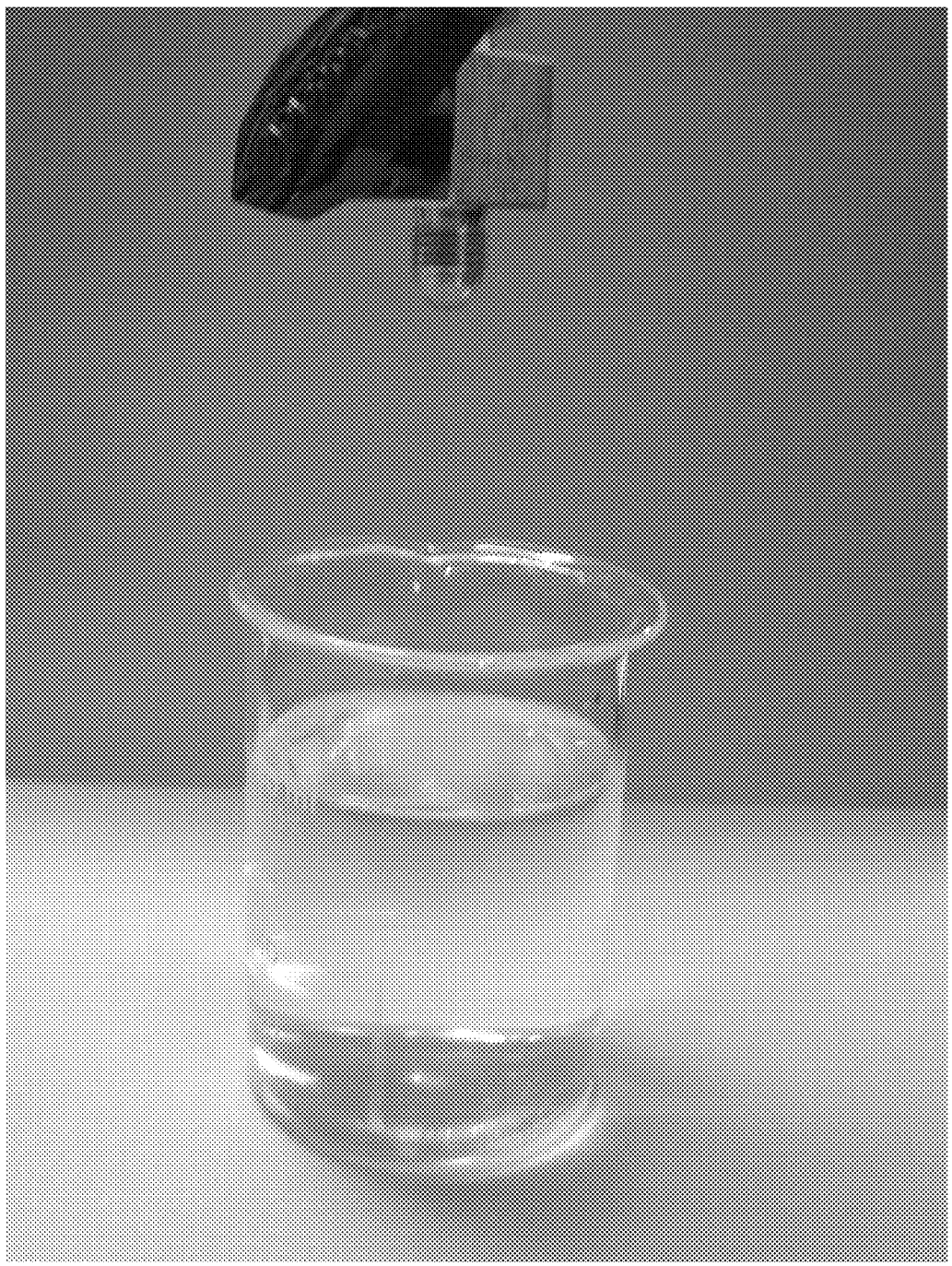
FIG. 5 is a more detailed photograph of the clear water having passed through the sand pack test apparatus of FIG. 4 showing that the water has been purified.

FIGS. 4 and 5 show that cloudy fluid (simulated waste water) at the top of the sand pack flows into the nanoparticles treated sand pack and clear, clean water flows out of the pack at the bottom (FIG. 5). This means that the tiny impurity particles (bentonite and illite) in the waste-water are captured in the sand pack by the nanoparticles.

Rev Dust (the mean particle size was about 20 microns and it contained 12% quartz, 7% cristobalite, 4% illite, 29% mixed layers, 26% kaolinite, and 22% chlorite) was used as another simulated wastewater for tests like Example 1 and 2. The results are the same as that of bentonite and illite wastewater flowing through the sand pack. These Rev Dust particles were clearly and easily removed.

The nanoparticles were 35 nm MgO, product #12N-0801 available from Inframat Advanced Materials. The procedure for making the nanoparticles-treated sand pack was as follows:
1. Mixed the nanoparticles with 99.8 wt % monopropylene glycol to make 2 pound per gallon (ppg) (0.2 kg/liter) (2 pounds (0.9 kg) nanoparticles in one gallon monopropylene glycol) suspension (nano-fluid).
2. Added 2.5 ml of the nano-fluid from step 1 into 250 grams of 20/40 mesh (850/425 micron) sand in a bottle, and shook the bottle several minutes to make the sand uniformly coated by the nano-fluid.
3. Poured the treated sand into a one-inch (2.54 cm) inner diameter (ID) acrylic tube to form the sand pack for testing.

After 90 ml of the particle-containing, highly-concentrated cloudy water was passed through the treated sand pack, clean, clear water still flowed out of the pack.

Regenerative Example 3

A process of regenerating the sand or ceramic particle bed may include using a lightly acidic water to strip the nanoparticles and trapped/fixed sediments, contaminants or impurities from the bed pack. In one non-restrictive version, the acidic water may be 1.0% HCl or 2% citric acid in tap water to dose the bed pack. Then, new nanoparticles would be placed back onto the bed pack, again as a dose treatment fluid composed of nanoparticles product added to tap water or glycol or the like to re-coat or re-plate the nanoparticles onto the bed pack particles or materials. The nanoparticles product may be a glycol, such as propylene glycol, as mentioned, or a USP or technical grade mineral oil slurry product.

The acidic stripping fluid, once it removes the nanoparticles and trapped/fixated sediments, would need appropriate conditioning and/or disposal. If the trapped sediments are simply river sediments, like soil particles, then the acidic waste could simply be neutralized (for instance with sodium bicarbonate (baking soda) or other common material), and would then be a non-hazardous material, relatively easy to dispose of. However, if there are heavy metals and the like, for instance, toxic components to the sediments that were trapped or captured (e.g. toxic elements, compounds, contaminated soil particles, etc.) by the fixation of the nanoparticles, then once stripped by the acidic water, the stripping fluid would need appropriate handling, conditioning and/or disposal.

In the foregoing specification, it will be evident that various modifications and changes may be made thereto without departing from the broader spirit or scope of the invention as set forth in the appended claims. Accordingly, the specification is to be regarded in an illustrative rather than a restrictive sense. For example, specific combinations of alkaline earth metal oxides, alkaline earth metal hydroxides, alkali metal oxides, alkali metal hydroxides, transition metal oxides, transition metal hydroxides, post-transition metal oxides, post-transition metal hydroxides, piezoelectric crystals, and pyroelectric crystals, of various sizes; brines; base fluids; bed and pack particles (sand, ceramic or glass beads, gravel); coating agents (glycols, alcohols, mineral oils) and other components falling within the claimed parameters, but not specifically identified or tried in a particular composition, are anticipated to be within the scope of this invention.

The present invention may suitably comprise, consist or consist essentially of the elements disclosed and may be practiced in the absence of an element not disclosed.

The words "comprising" and "comprises" as used throughout the claims is to interpreted "including but not limited to".

What is claimed is:

1. A method for purifying an aqueous liquid containing clay particles, the method comprising:
contacting said aqueous liquid with a particle pack comprising substrate particles and comparatively smaller particulate additives;
where the substrate particles are comparatively larger than the particulate additives and are selected from the group consisting of sand, gravel, ceramic beads, glass beads, and combinations thereof,
where the particle pack is at least partially coated with a coating agent comprising a mineral oil,
where the particulate additives have a mean particle size of 1000 nm or less and are alkaline earth metal hydroxides; and
attracting said clay particles from the aqueous liquid to the particulate additives to purify the aqueous liquid.

2. The method of claim 1 where
the alkaline earth metal is selected from the group consisting of magnesium, calcium, and mixtures thereof.

3. The method of claim 1 where the particulate additives are present in an amount ranging from about 1 part by weight particulate additive for about 200 to about 5000 parts by weight of the particle pack.

4. The method of claim 1 where the mean particle size of the particulate additives is from about 4 nm to about 500 nm.

5. The method of claim 1 where the substrate particles in the particle pack have a mean particle size ranging from about 2000 microns to about 45 microns.

6. A method for purifying aqueous fluids containing clay particles, the method comprising:
contacting said aqueous liquid with a particle pack comprising substrate particles and comparatively smaller particulate additives;
where the substrate particles are comparatively larger than the particulate additives, have a mean particle size of from about 2000 microns to about 45 microns and are selected from the group consisting of sand, gravel, ceramic beads, glass beads, and combinations thereof, and where the particulate additives:
where the particle pack is at least partially coated with a coating agent comprising a mineral oil,
where the particulate additives have a mean particle size of 1000 nm or less and are alkaline earth metal hydroxides;
where the particulate additives range from about 1 part by weight for about 200 to about 5000 parts by weight of the particle pack; and
attracting said clay particles from the aqueous liquid to the particulate additives to purify the aqueous liquid.

7. The method of claim 6 where
the alkaline earth metal is selected from the group consisting of magnesium, calcium, and mixtures thereof.

8. The method of claim 6 where the mean particle size of the particulate additives is from about 4 nm to about 500 nm.

9. A method for purifying an aqueous liquid containing clay particles, the method comprising:
contacting said aqueous liquid with a particle pack comprising substrate particles and comparatively smaller particulate additives;
where the substrate particles are comparatively larger than the particulate additives and are selected from the group consisting of sand, gravel, ceramic beads, glass beads, and combinations thereof where the particle pack is at least partially coated with a coating agent comprising a mineral oil,
where the particulate additives are of smaller mean particle size than the substrate particles, where the particulate additives are at least partially coated on the substrate particles by the mineral oil, and where the particulate additives have a mean particle size of 1000 nm or less and are alkaline earth metal hydroxides; and
attracting said clay particles from the aqueous liquid to the particulate additives to purify the aqueous liquid.

10. The method of claim 9 where
the alkaline earth metal is selected from the group consisting of magnesium, calcium, and mixtures thereof.

11. The method of claim 9 where the particulate additives are present in an amount ranging from about 1 part by weight particulate additive for about 200 to about 5000 parts by weight of the particle pack.

12. The method of claim 9 where the mean particle size of the particulate additives is from about 4 nm to about 500 nm.

13. The method of claim 9 where the substrate particles in the particle pack have a mean particle size ranging from about 2000 microns to about 45 microns.

* * * * *